United States Patent
Bagepalli et al.

(10) Patent No.: US 7,736,125 B2
(45) Date of Patent: Jun. 15, 2010

(54) REMOVABLE BEARING ARRANGEMENT FOR A WIND TURBINE GENERATOR

(75) Inventors: Bharat Sampathkumaran Bagepalli, Niskayuna, NY (US); Patrick Lee Jansen, Scotia, NY (US); Aniruddha Dattatraya Gadre, Rexford, NY (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 12/074,629

(22) Filed: Mar. 5, 2008

(65) Prior Publication Data
US 2008/0199309 A1    Aug. 21, 2008

Related U.S. Application Data

(62) Division of application No. 11/243,531, filed on Oct. 5, 2005, now Pat. No. 7,360,310.

(51) Int. Cl.
*F01D 25/16* (2006.01)
*F03D 11/00* (2006.01)

(52) U.S. Cl. ............... 415/126; 415/213.1; 415/229
(58) Field of Classification Search ............ 415/213.1, 415/126, 209.3, 229
See application file for complete search history.

(56) References Cited

U.S. PATENT DOCUMENTS

| | | | |
|---|---|---|---|
| 4,272,929 A | | 6/1981 | Hanson |
| 4,527,072 A | * | 7/1985 | van Degeer ................. 290/55 |
| 5,952,746 A | * | 9/1999 | Mittmann et al. ......... 310/12.31 |
| 6,700,288 B2 | * | 3/2004 | Smith ................. 310/216.023 |
| 6,781,276 B1 | * | 8/2004 | Stiesdal et al. ........... 310/254.1 |
| 6,833,632 B2 | | 12/2004 | Becker et al. |
| 7,360,310 B2 | | 4/2008 | Bagepalli et al. |
| 2004/0245883 A1 | * | 12/2004 | Mitcham et al. ............ 310/216 |
| 2007/0025840 A1 | | 2/2007 | Weaver et al. |
| 2007/0075548 A1 | | 4/2007 | Bagepalli et al. |

FOREIGN PATENT DOCUMENTS

WO   WO 2004027260 A1 *   4/2004

* cited by examiner

*Primary Examiner*—Edward Look
*Assistant Examiner*—Jesse Prager
(74) *Attorney, Agent, or Firm*—James McGinness, Esq.; Armstrong Teasdale LLP

(57) ABSTRACT

A wind generator having removable change-out bearings includes a rotor and a stator, locking bolts configured to lock the rotor and stator, a removable bearing sub-assembly having at least one shrunk-on bearing installed, and removable mounting bolts configured to engage the bearing sub-assembly and to allow the removable bearing sub-assembly to be removed when the removable mounting bolts are removed.

20 Claims, 10 Drawing Sheets

REMOVABLE BEARING ARRANGEMENT FOR A WIND TURBINE GENERATOR

CROSS REFERENCE TO RELATED APPLICATIONS

This application is a divisional application of U.S. patent application Ser. No. 11/243,531, filed Oct. 5, 2005, and issued as U.S. Pat. No. 7,360,310 on Apr. 22, 2008, which is hereby incorporated by reference in its entirety.

STATEMENT REGARDING FEDERALLY SPONSORED RESEARCH & DEVELOPMENT

The U.S. Government has certain rights in this invention as provided for by the terms of NREL Subcontract No. NREL-ZAM-4-31235-05, Prime Contract DE-AC36-99GO10337 awarded by the Department of Energy.

BACKGROUND OF THE INVENTION

This invention relates generally to generators, and more particularly to wind turbine generators having replaceable bearings.

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

Wind turbines including direct drive generators eliminate the gearbox, and reliability problems associated with the gearboxes. However, in at least some known geared wind turbines, both the generator and main bearings may prematurely fail. Because the direct drive generator bearings also function as the main bearings of the wind turbine, a means to readily replace the bearings is needed. To facilitate replacement of such bearings, at least one known direct drive wind turbine utilizes a single large-diameter bearing with a bolt-on flange. However, the combination of the large diameter and bolt-on flange causes the bearing to be expensive in comparison to other known bearing arrangements.

To facilitate reducing costs while optimizing turbine availability, bearing replacement should be performed rapidly at the wind turbine site with a minimal infrastructure and skill set required. However, known shrunk-on bearings used in direct drive wind turbines generally require change-out at the factory.

BRIEF DESCRIPTION OF THE INVENTION

One aspect of the present invention therefore provides a wind generator having removable change-out bearings. The generator includes a rotor and a stator, locking bolts configured to lock the rotor and stator, a removable bearing sub-assembly having at least one shrunk-on bearing installed, and removable mounting bolts configured to engage the bearing sub-assembly and to allow the removable bearing sub-assembly to be removed when the removable mounting bolts are removed.

Another aspect of the present invention provides a method for changing bearings in a direct-drive wind generator. The method includes locking a rotor and a stator of the generator, and while the generator is in place on a tower on which it is installed, dismounting a bearing sub-assembly from the generator. The method further includes either replacing or repairing the bearing sub-assembly, or both, and, while the generator is still in place on the tower, assembling the replaced or repaired bearing sub-assembly in the generator.

It will thus be observed that configurations of the present invention provide wind turbines with bearings that are easy to remove without having to disassemble the entire wind turbine generator, hub, and blades. Moreover, some configurations of the present invention will also be observed to provide other advantages, such as light weight construction.

DETAILED DESCRIPTION OF THE INVENTION

Figure 1:
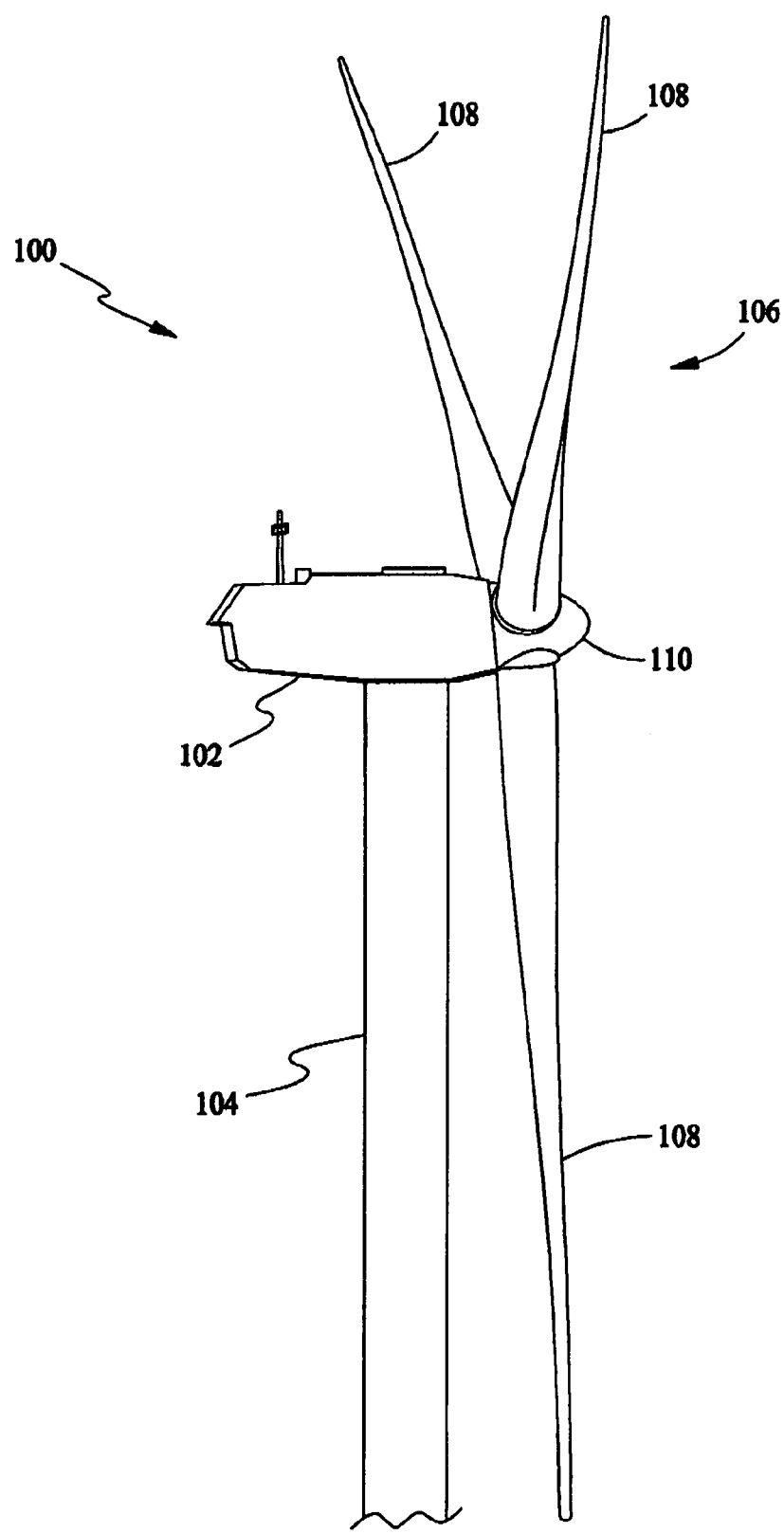
FIG. 1 is a drawing of an exemplary configuration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
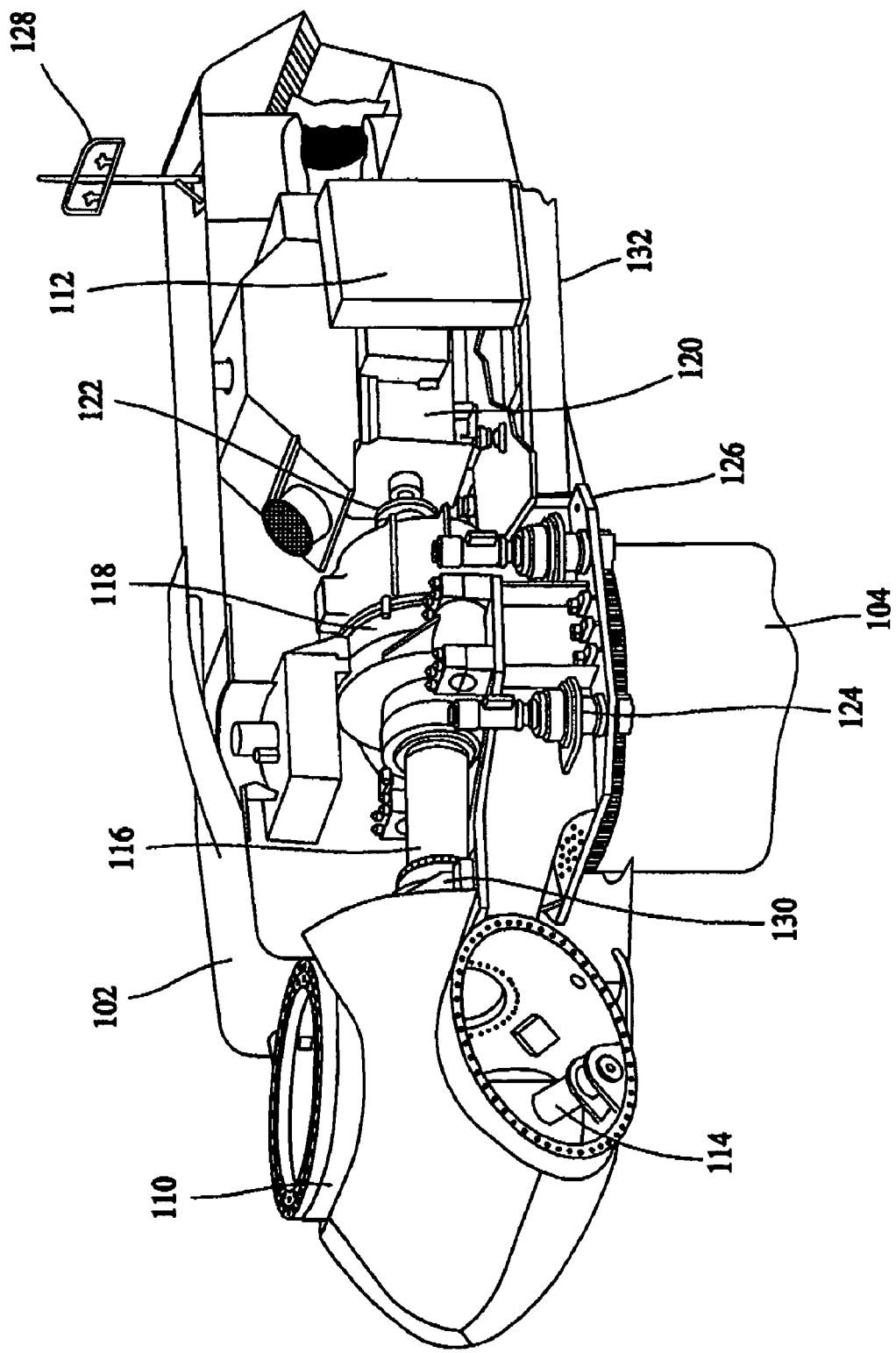
FIG. 2 is a cut-away perspective view of a nacelle of the exemplary wind turbine configuration shown in FIG. 1 and including a known geared drivetrain.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system used for overall system monitoring and control. Alternative distributed or centralized control architectures are used in some configurations.

In some configurations, a variable blade pitch drive 114 is provided to control the pitch of blades 108 (not shown in FIG. 2) that drive hub 110 as a result of wind. In some configurations, the pitches of blades 108 are individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 via main bearing 130 and (in some configurations), at an opposite end of shaft 116 to a gear box 118. Gear box 118 drives a high speed shaft of generator 120. In other configurations, main rotor shaft 116 is coupled directly to generator 120. The high speed shaft (not identified in FIG. 2) is used to drive generator 120, which is mounted on main frame 132. In some configurations, rotor torque is transmitted via coupling 122. In configurations of the present invention, generator 120 is a direct drive permanent magnet generator.

Yaw drive 124 and yaw deck 126 provide a yaw orientation system for wind turbine 100. A meterological boom 128 provides information for turbine control system 300, which may include wind direction and/or wind speed. In some configurations, the yaw system is mounted on a flange provided atop tower 104.

Figure 3:
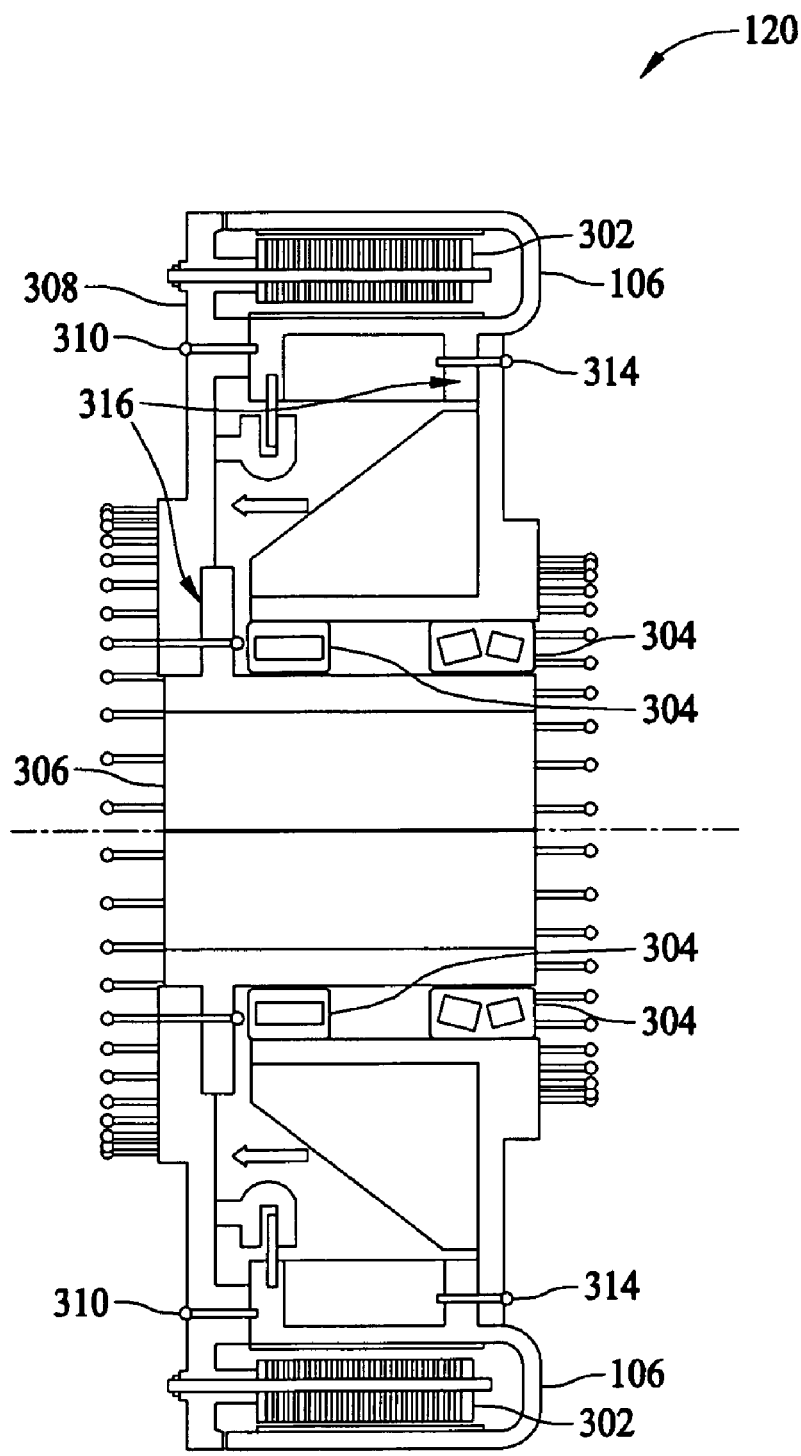
FIG. 3 is a side cut-away view of a configuration of an exemplary direct drive generator configuration including removable change-out bearings installed.
Figure 4:
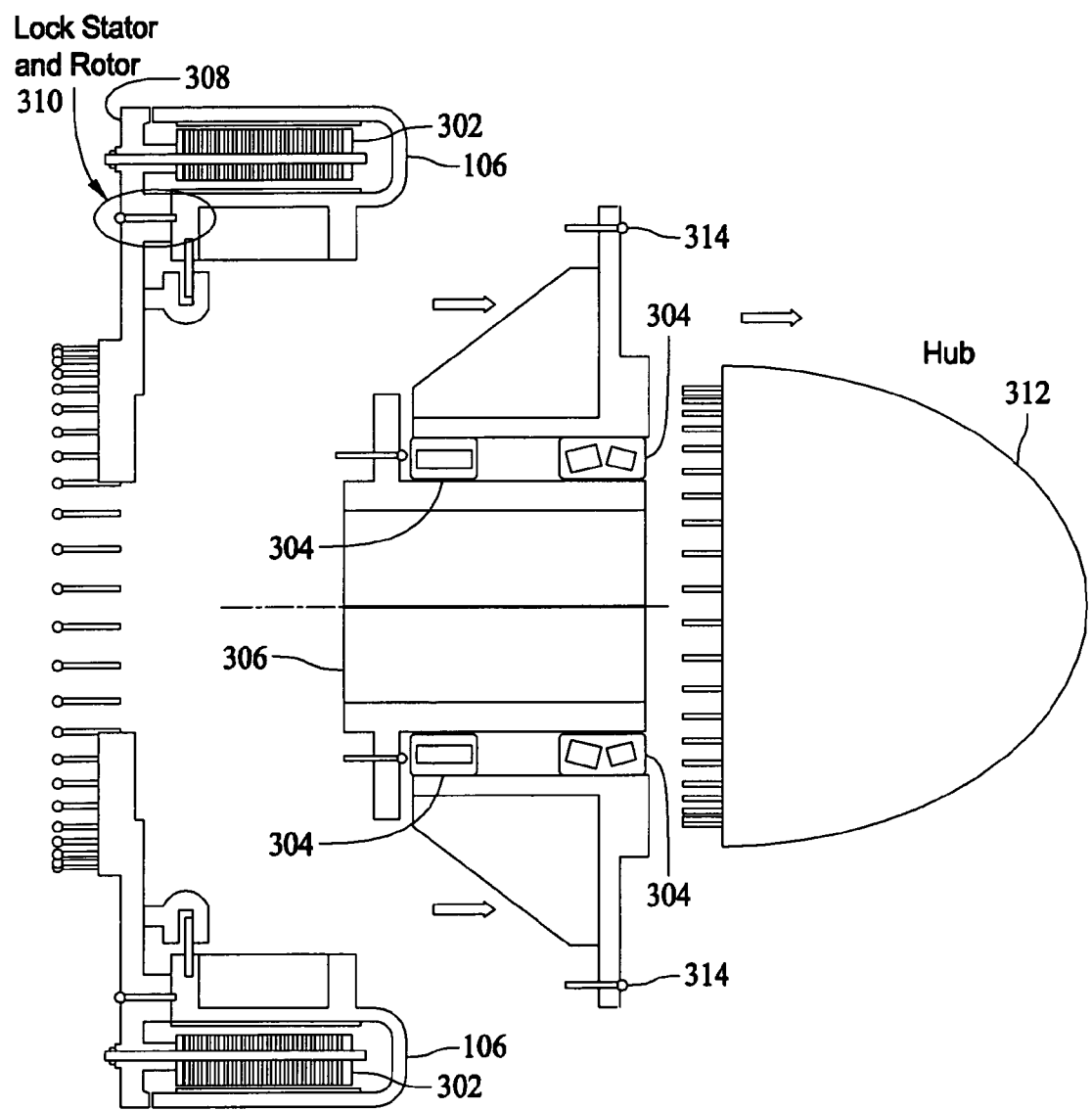
FIG. 4 is a side cut-away view of the configuration shown in FIG. 3 with its bearing assembly pulled out.

In some configurations of the present invention and referring to FIG. 3, generator 120 (shown only in part in FIG. 3 and subsequent figures) is a direct drive generator with permanent magnets 302. Generator 120 is provided with removable (change-out) bearings 304 installed on a removable bearing sub-assembly 306. (Configurations can use at least one up to any number of bearings 304, even though FIG. 3 shows a configuration using exactly two bearings.) To change or upgrade a bearing 304, rotor 106 and stator 308 of generator 120 are locked using locking bolts 310 to ensure that stator 308 and rotor 106 remain in place up-tower where generator 120 is installed. Hub 312 and blades 108 are then disassembled on locked generator 120. Bearing sub-assembly 306 is then dismounted by, for example and referring to FIG. 4, removing mounting bolts 314 along two flanges 314. Alternatively, the entire generator 120 may be lowered to the ground, locking bolts 310 installed, and bearing sub-assembly 306 replaced.

Figure 5:
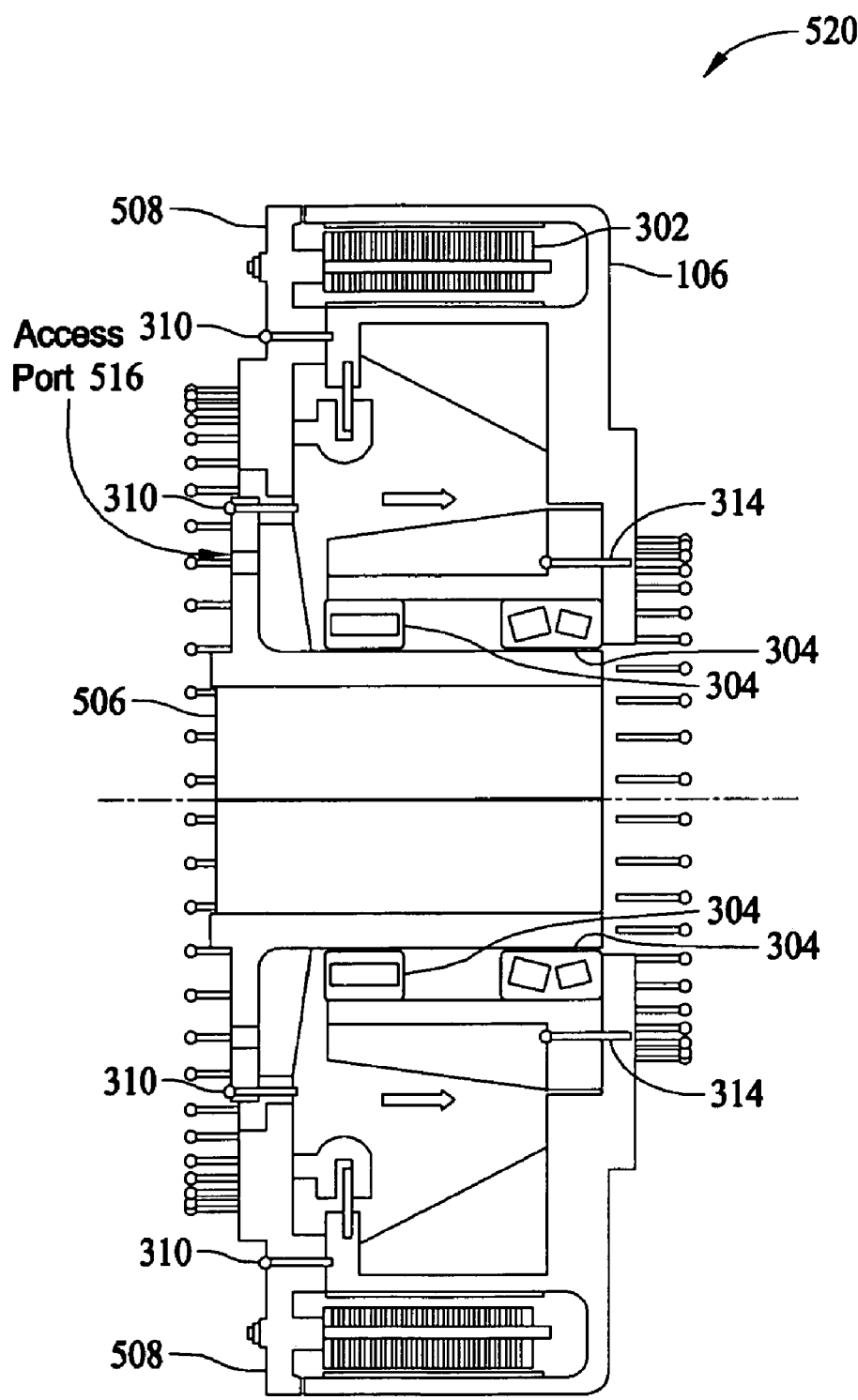
FIG. 5 is a side cut-away view of an alternative embodiment of a direct drive generator configuration including removable change-out bearings installed.
Figure 6:
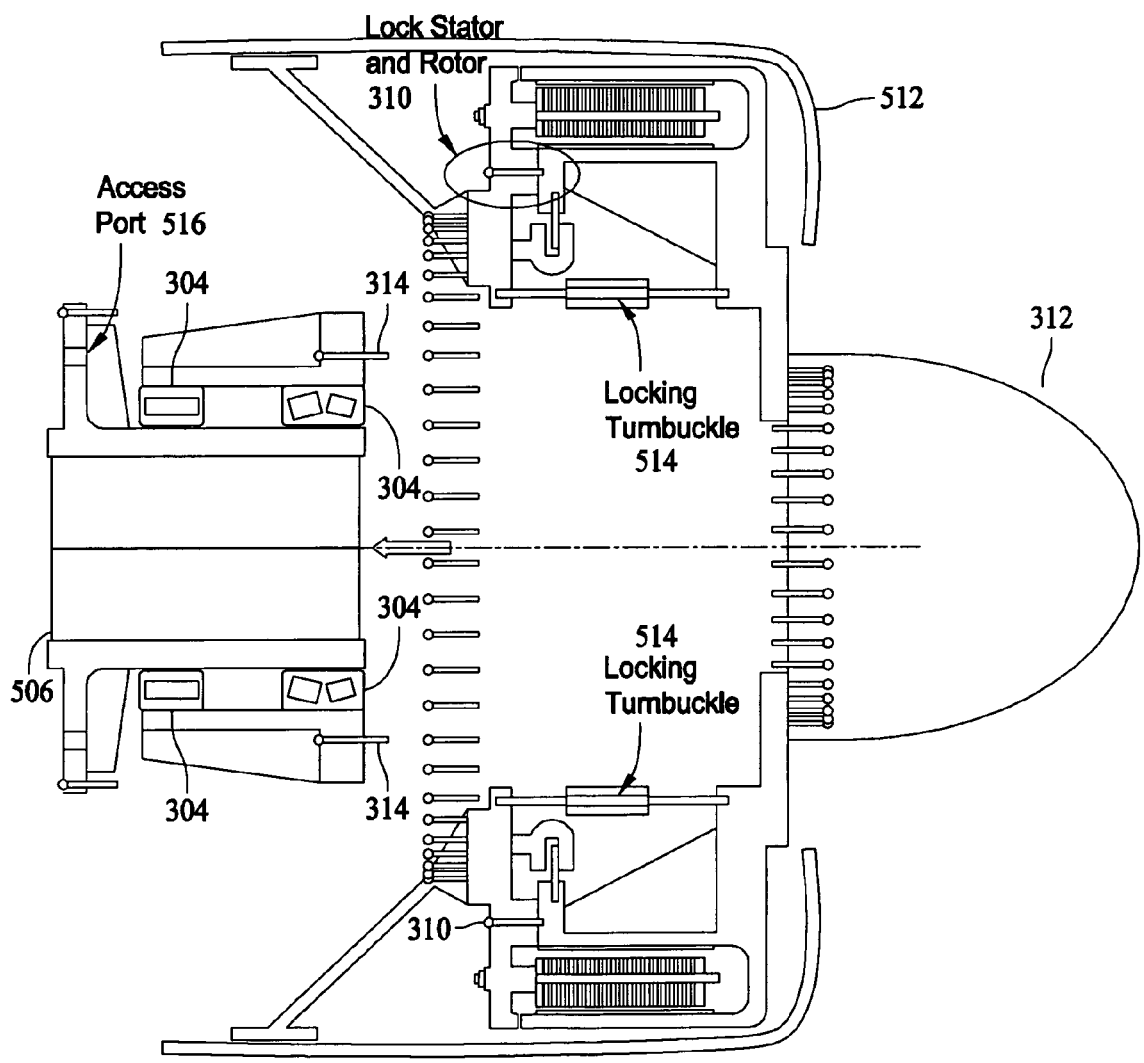
FIG. 6 is a side cut-away view of the configuration shown in FIG. 5 with its bearing assembly pulled out.
Figure 7:
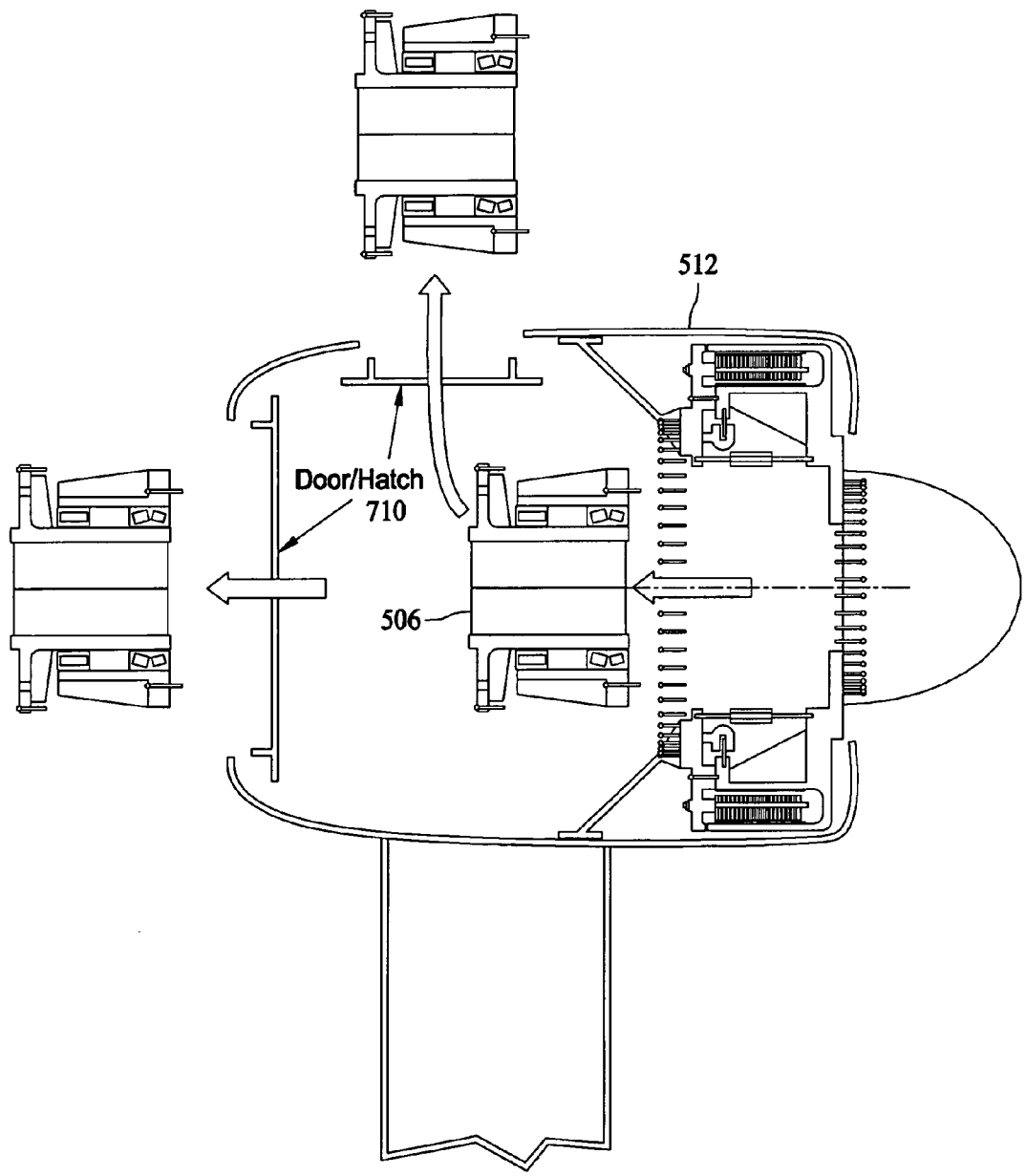
FIG. 7 is a side cut-away schematic view of the configuration shown in FIG. 6, showing examples of suitable locations for a removal door or hatch.

In yet other configurations of the present invention and referring to FIG. 5, a two-bearing generator 520 is provided with removable bearings 304. Generator 520 configurations can generally be substituted for, but are otherwise distinguished from generator 120 configurations in that generator 520 configurations do not require removal of hub 312. (Configurations of generator 520 can use at least one up to any number of bearings 304, even though FIG. 5 shows a configuration using exactly two bearings.) Shrunk-on bearings 304 are installed on a removable bearing sub-assembly 506. To change or upgrade a bearing 304, rotor 106 and stator 508 are locked using, for example, locking bolts 310, to ensure that stator 508 and rotor 106 will remain in place up-tower where generator 520 is installed. Bearing subassembly 506 is then dismounted by removing mounting bolts 314 along two flanges 314. Bearing subassembly 506 can be removed within the tower cabin or nacelle 102 as shown in FIG. 6 and later lowered to the ground via an exit hatch or door 710, which are provided, for example, at the top or rear of generator housing 512, as shown in FIG. 7. In some configurations, to ensure that hub 312 and blades 108 are held stably, several turn-buckle locks 514 are inserted either before disengaging bearing subassembly 506, or simultaneously or shortly thereafter. Turn-buckle locks 514 can be inserted before disengaging bearing subassembly 506 using access ports 516 shown in FIG. 5. The use of turn-buckle locks 514 ensures direct load-path from hub 312 and blades 108 into generator housing 512 and tower 104 with bearings 304 removed. Alternatively, the entire generator 520 may be lowered to the ground, locking bolts 310 installed, and bearing sub-assembly 506 replaced.

Figure 8:
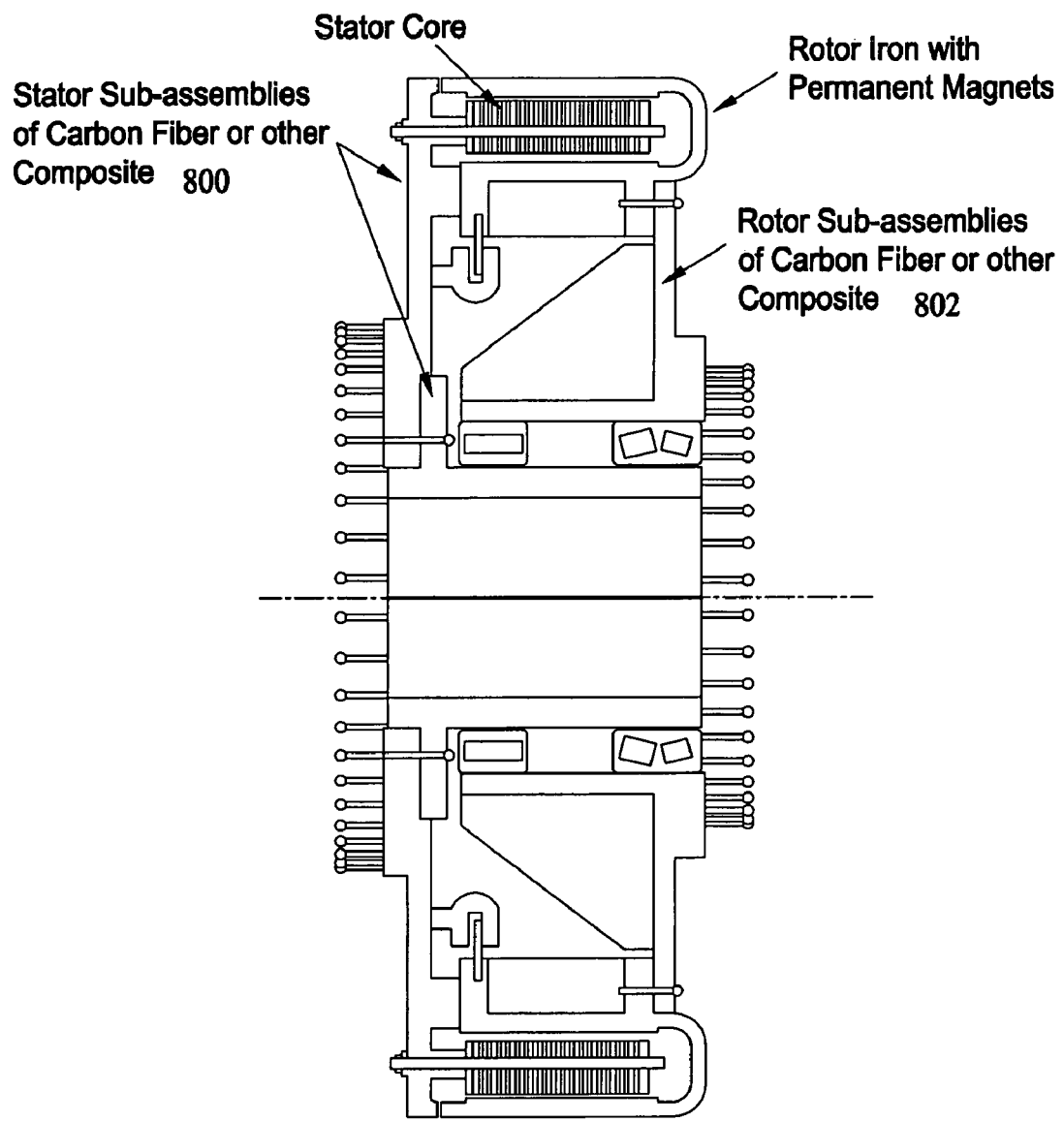
FIG. 8 is a side cut-away view of an exemplary configuration of a direct drive generator configuration including removable change-out bearings in which a stator sub-assembly or rotor sub-assembly, or both, comprise carbon fiber and/or composite material.
Figure 9:
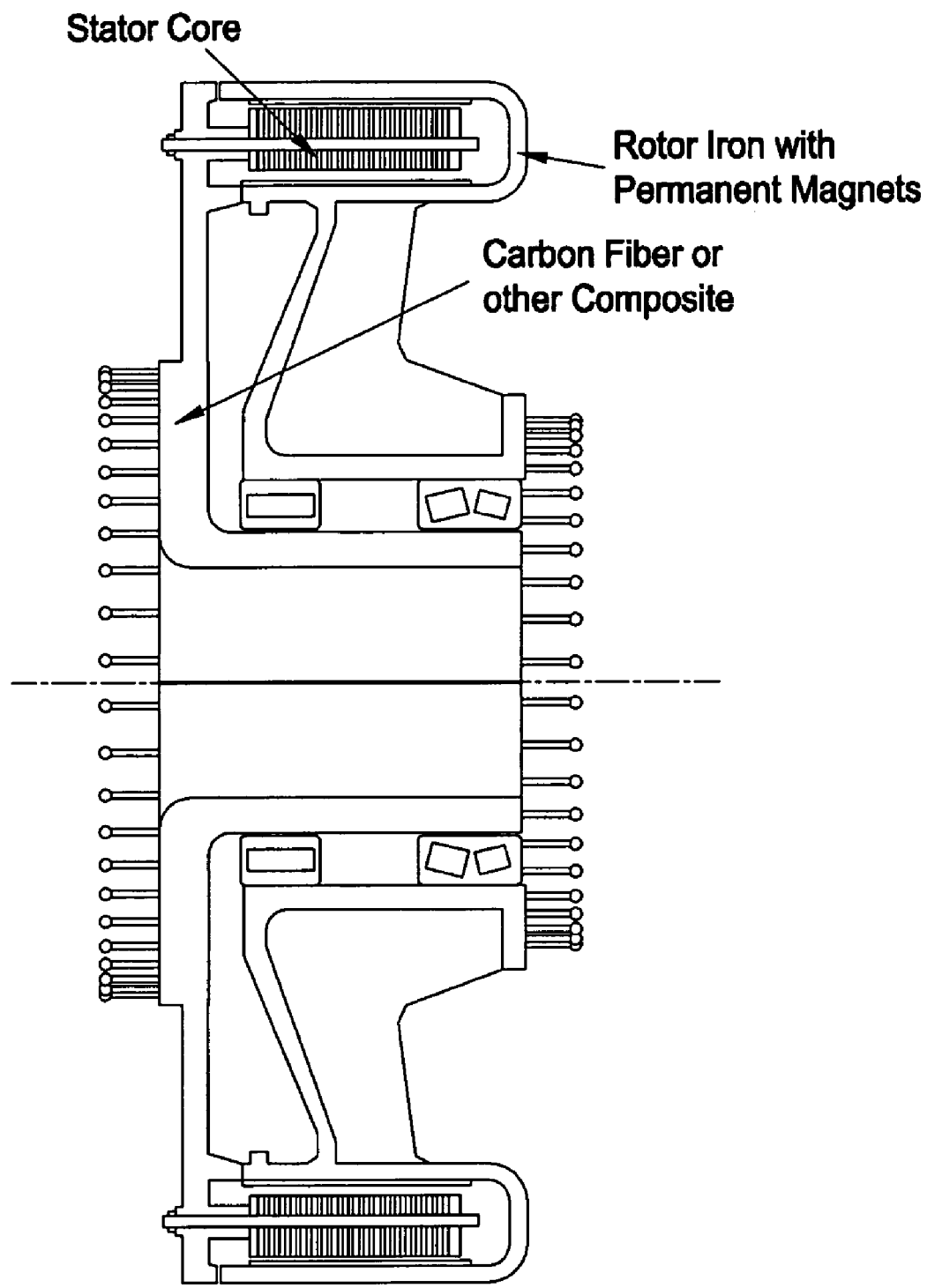
FIG. 9 is a side cut-away view of an exemplary configuration of a two-bearing wind generator using carbon fiber and/or composite material.
Figure 10:
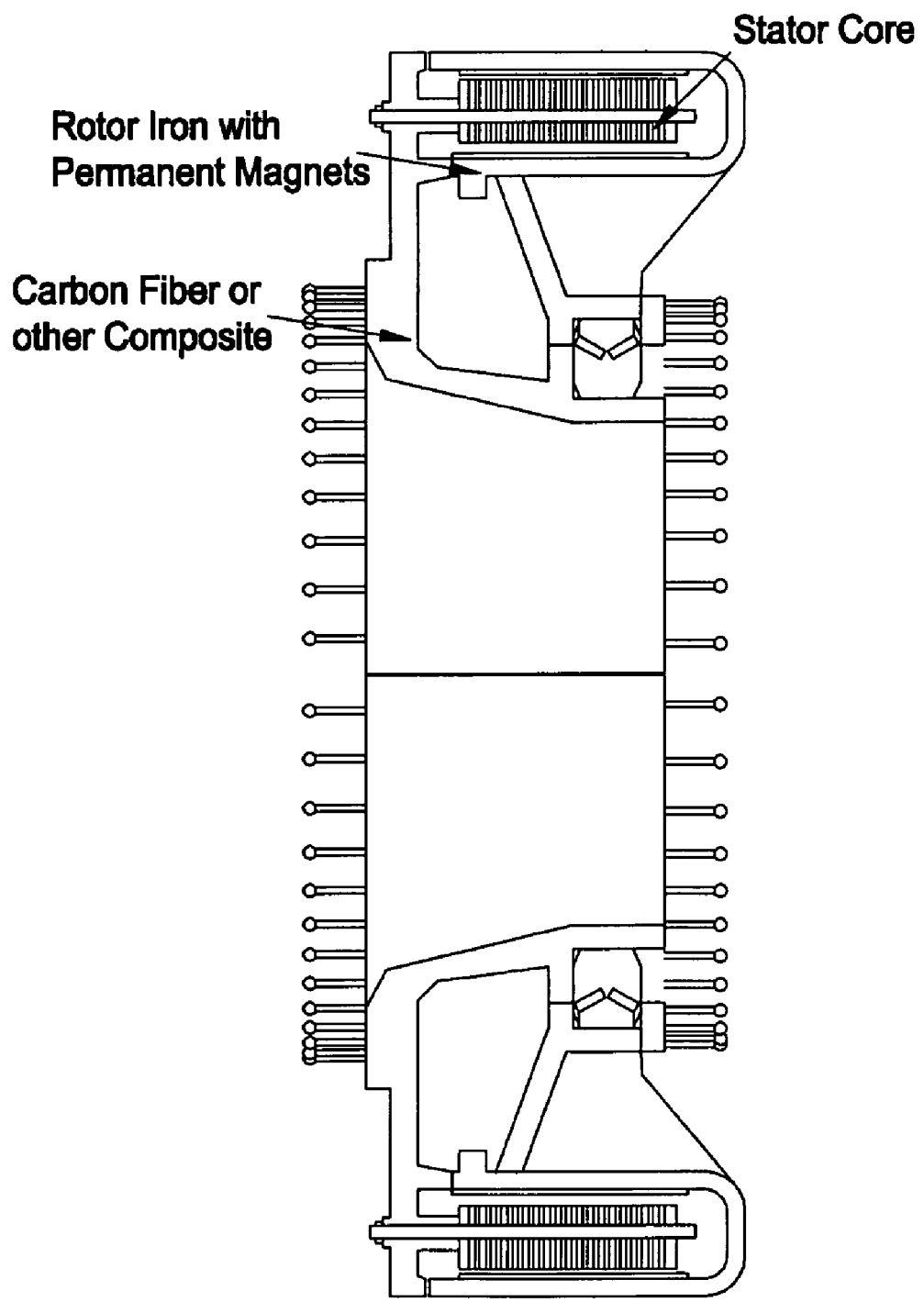
FIG. 10 is a side cut-away view of an exemplary configuration of a single-bearing generator using carbon fiber and/or composite material.

In some configurations of the present invention and referring to an example configuration shown in FIG. 8, either stator sub-assembly 800 or rotor sub-assembly 802, or both, may comprise carbon fiber and/or another suitable composite material. The use of such material or materials results in a low weight wind generator modular unit. Another example of a two-bearing wind generator using carbon fiber and/or composite material is shown in FIG. 9, and an example of a single-bearing generator using such material is shown in FIG. 10.

Further, in some configurations of the present invention and referring again to FIG. 3, damping inserts 316 can be provided that isolate hub and blade dynamics and noise from the generator and the tower.

Exemplary embodiments of maintenance/assembly methods and apparatus are described above in detail. The methods and the apparatus are not limited to the specific embodiments described herein nor to the specific components being replaced or assembled, but rather, the maintenance/assembly methods described herein may be utilized independently and separately from other methods described herein or to replace other components not described herein. For example, other turbine components can also be replaced using the methods described herein.

While the invention has been described in terms of various specific embodiments, those skilled in the art will recognize that the invention can be practiced with modification within the spirit and scope of the claims.

What is claimed is:

1. A direct-drive wind generator having removable change-out bearings comprising:
   a rotor and a stator;
   locking mechanisms configured to lock said rotor and said stator;
   a removable bearing sub-assembly coupled within said rotor and comprising at least one shrunk-on bearing installed therein; and
   removable mounting bolts configured to engage said bearing sub-assembly and to allow said bearing sub-assembly to be removed from said rotor when said mounting bolts are removed.

2. A wind generator in accordance with claim 1 wherein said stator has flanges engaged to said mounting bolts.

3. A wind generator in accordance with claim 1 wherein said bearing sub-assembly comprises at least two bearings.

4. A wind generator in accordance with claim 1 wherein said wind generator further comprises a hub, and said bearing sub-assembly further comprises flanges at a first end of said bearing sub-assembly, said flanges configured to engage said stator, and said hub engaged with said bearing sub-assembly at a second end of said bearing sub-assembly opposite the first end.

5. A wind generator in accordance with claim 4 wherein said hub is configured for removal in a same direction as, and prior to or simultaneously with, disengagement of said bearing sub-assembly.

6. A wind generator in accordance with claim 4 wherein said bearing sub-assembly is configured to disengage said stator in a direction opposite said hub, and said hub is configured to remain in place during removal of said bearing sub-assembly.

7. A wind generator in accordance with claim 6 further comprising a generator housing comprising at least one of a door and a hatch through which said stator can be removed.

8. A wind generator in accordance with claim 1 wherein said stator comprises one of a carbon fiber material and a composite material.

9. A wind generator in accordance with claim 1 wherein said rotor comprises one of a carbon fiber material and a composite material.

10. A wind generator in accordance with claim 9 wherein said stator comprises one of a carbon fiber material and a composite material.

11. A direct-drive wind generator comprising:
   a stator;
   a rotor coupled to said stator;
   at least one locking mechanism configured to lock said rotor and said stator;
   a bearing sub-assembly removably positioned within said rotor, and having at least one shrunk-on bearing installed thereon; and
   at least one mounting bolt removably coupled to said bearing sub-assembly, said bearing sub-assembly removable from within said rotor with said at least one shrunk-on bearing installed on said bearing sub-assembly when said at least one mounting bolt is removed from said bearing sub-assembly.

12. A wind generator in accordance with claim 11 wherein said stator comprises a plurality of flanges coupled to said at least one mounting bolt.

13. A wind generator in accordance with claim 11 wherein said at least one shrunk-on bearing comprises two shrunk-on bearings.

14. A wind generator in accordance with claim 11 further comprising a hub coupled to a first end of said bearing sub-assembly, and a plurality of flanges formed at an opposing second end of said bearing sub-assembly, said plurality of flanges coupled to said stator.

15. A wind generator in accordance with claim 14 wherein said hub configured for removal in a same direction as, and prior to or simultaneously with, disengagement of said bearing sub-assembly.

16. A wind generator in accordance with claim 11 wherein said bearing sub-assembly configured to disengage said stator in a direction opposite said hub, and said hub configured to remain in place during removal of said bearing sub-assembly.

17. A wind generator in accordance with claim 16 further comprising a generator housing comprising at least one of a door and a hatch through which said stator can be removed.

18. A wind generator in accordance with claim 11 wherein said stator comprises at least one of a carbon fiber material and a composite material.

19. A wind generator in accordance with claim 11 wherein said rotor comprises at least one of a carbon fiber material and a composite material.

20. A wind generator in accordance with claim 19 wherein said stator comprises at least one of a carbon fiber material and a composite material.

* * * * *